US007896736B2

(12) United States Patent
Yarbrough

(10) Patent No.: US 7,896,736 B2

(45) Date of Patent: Mar. 1, 2011

(54) SYSTEM AND METHOD FOR SIMULATING THE OUTCOME OF AN ELECTRONIC BINGO GAME AS A BLACKJACK GAME

(75) Inventor: Jon Yarbrough, Smyrna, TN (US)

(73) Assignee: Video Gaming Technologies, Roebuck, SC (US)

( * ) Notice: Subject to any disclaimer, the term of this patent is extended or adjusted under 35 U.S.C. 154(b) by 948 days.

(21) Appl. No.: 10/938,490

(22) Filed: Sep. 10, 2004

(65) Prior Publication Data

US 2005/0059449 A1 Mar. 17, 2005

Related U.S. Application Data

(60) Provisional application No. 60/502,818, filed on Sep. 12, 2003.

(51) Int. Cl.
*A63F 13/00* (2006.01)

(52) U.S. Cl. .............................. 463/19; 463/17; 463/18

(58) Field of Classification Search .................. 463/19, 463/18, 17

See application file for complete search history.

(56) References Cited

U.S. PATENT DOCUMENTS 4,856,787 A * 8/1989 Itkis ........................... 273/237
5,393,057 A * 2/1995 Marnell, II ................... 463/13
6,471,387 B1 10/2002 Henshaw et al.
6,537,150 B1 * 3/2003 Luciano et al. ............... 463/16
7,329,183 B2 2/2008 Michaelson et al.
7,393,276 B2 * 7/2008 Millerschone ............... 463/17
2002/0132661 A1 * 9/2002 Lind et al. .................... 463/19
2005/0059466 A1 3/2005 Yarbrough
2005/0101387 A1 * 5/2005 Wolf ........................... 463/42
2005/0119042 A1 * 6/2005 Chamberlain et al. ......... 463/19
2006/0014582 A1 * 1/2006 Harris et al. .................. 463/25
2006/0025198 A1 * 2/2006 Gail et al. ..................... 463/19

* cited by examiner

*Primary Examiner*—James S. McClellan
*Assistant Examiner*—Jeffrey Wong
(74) *Attorney, Agent, or Firm*—Howard & Howard Attorneys PLLC

(57) ABSTRACT

A game system and method plays an electronic game and simulates the outcome as a blackjack game. The game system allows a player to place a wager. The outcome of the electronic game includes a payout according to a first pay table if a set of predetermined winning conditions has been achieved. The outcome of the bingo game is simulated as a blackjack game. The outcome of the blackjack game is equivalent to the outcome of the electronic game.

38 Claims, 2 Drawing Sheets

SYSTEM AND METHOD FOR SIMULATING THE OUTCOME OF AN ELECTRONIC BINGO GAME AS A BLACKJACK GAME

This application claims priority to U.S. Provisional Patent Application Ser. No. 60/502,818, filed Sep. 12, 2003.

FIELD OF THE INVENTION

The present invention relates generally to electronic games, and more particularly, to an electronic game whose results are presented as a simulated blackjack game.

BACKGROUND OF THE INVENTION

In some jurisdictions, wagering is permitted on certain types of games, e.g., Bingo, lotteries, pull-tabs, is allowed. The types of games games may be electronic.

In one scenario, an electronic game, such as bingo, is provided in which players compete with and against each other. A minimum of two players is needed. Each player uses a player terminal which is inter-linked, e.g., via an Ethernet network, to a central server. To initiate the play of the game, a player inserts credits or coins, or currency into the player terminal. The coins or currency may be converted into credits. The number of credits are added to a credit meter and displayed on a display screen.

If the game being played is Bingo, the player selects the level of play by pressing a "bet" button to set the wager amount for a bingo card. The player may then initiate the bingo game by pressing a "play" button.

The server, after determining that enough players have entered the game, randomly determines a string of numbers and transmits the numbers to the player terminals. These are daubed, automatically or by the player, onto their card(s).

Each game has a defined game-ending pattern. As soon, as the string of numbers results in the game ending pattern for one of the players on one of the cards, the bingo game is over and no additional numbers are transmitted. The player with the game-ending or winning pattern is awarded a payout, in terms of credits, according to a pay table which may be traded in for cash.

However, in such jurisdictions, wagers on other types of games, such as blackjack, may not be permitted. Those persons desiring to wager on blackjack games may not be interested in playing Bingo.

The present invention is aimed at one or more of the problems identified above.

SUMMARY OF THE INVENTION

In a first aspect of the present invention a game system for playing an electronic game is provided. The game includes a player game device and a game controller. The a player game device allows a player to place a wager. The game controller is coupled to the player game device for playing the electronic game and establishing an outcome of the electronic game. The outcome of the electronic game includes a payout according to a first pay table if a set of predetermined winning conditions has been achieved. The game controller further for simulating a blackjack game on the player device. The outcome of the blackjack game is equivalent to the outcome of the electronic game.

In a second aspect of the present invention, a method for playing an electronic game is provided. The method includes the steps of allowing a player to place a wager, playing the electronic game and establishing an outcome of the electronic game,. The outcome of the electronic game including a payout according to a first pay table if a set of predetermined winning conditions has been achieved. The method further includes the step of simulating an electronic blackjack game where the outcome of the blackjack game is equivalent to the outcome of the electronic game.

In a third aspect of the present invention, a game system for playing an electronic game is provided. The game system includes a player game device and a game controller. The player game device allows a player to place a wager and purchase an electronic bingo card. The electronic bingo card has a grid containing a set of numbers and has an associated winning pattern. The game controller is coupled to the player game device and establishes a set of randomly chosen numbers, compares the set of randomly chosen numbers with the associated winning pattern and establishes an outcome of the electronic bingo game. The outcome of the electronic bingo game includes a payout according to a first pay table if the winning pattern has been achieved. The game controller simulates a blackjack game on the player device. The outcome of the blackjack game is equivalent to the outcome of the electronic bingo game.

In a fourth aspect of the present invention, a method for playing an electronic bingo game is provided. The method includes the steps allowing a player to place a wager and purchase an electronic bingo card, establishing a set of randomly chosen numbers, comparing the set of randomly chosen numbers with the associated winning pattern, and establishing an outcome of the electronic bingo game. The electronic bingo card has a grid containing a set of numbers and an associated winning pattern. The outcome of the electronic bingo game includes a payout according to a first pay table if the winning pattern has been achieved. The method also includes the step of simulating an electronic blackjack game. The outcome of the blackjack game is equivalent to the outcome of the electronic bingo game.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Figure 1:
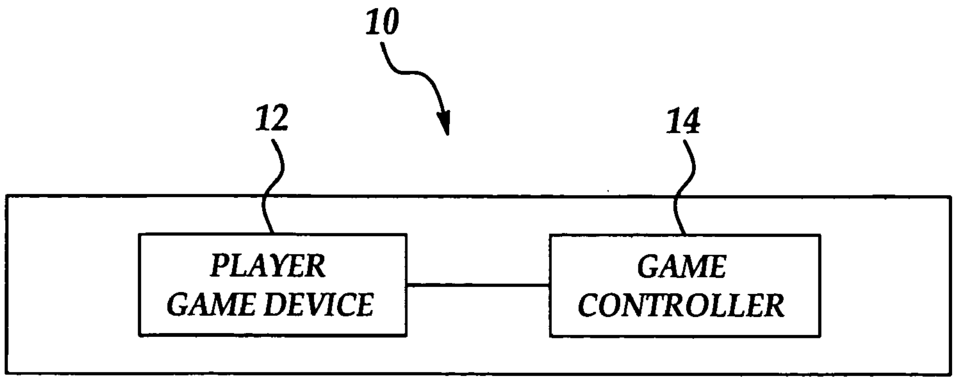
FIG. 1 is block diagram of a game system for simulating the outcome of an electronic bingo game as a blackjack game, according to an embodiment of the present invention.

With reference to the drawings and in operation, the present invention provides a game system 10 for playing an electronic game. With particular reference to FIG. 1, the game system 10 includes a player game device 12 and a game controller 14.

The a player game device 12 allows a player to place a wager. The game controller 14 is coupled to the player game device 12 for playing the electronic game and establishing an outcome of the electronic game. The outcome of the electronic game includes a payout according to a first pay table if a set of predetermined winning conditions has been achieved. The game controller 14 simulates a blackjack game on the player device 12. The outcome of the blackjack game is equivalent to the outcome of the electronic game.

The electronic game may be any type of game which has an outcome and provides a payout. For example, the types of electronic games may include, but is not limited to, bingo and similar games, slot machines, casino games, card games, dog or horse racing, lotteries, and all other forms of gaming. For purposes of illustration only, the present invention is described below in terms of bingo, but the present invention is not limited to such.

Figure 2:
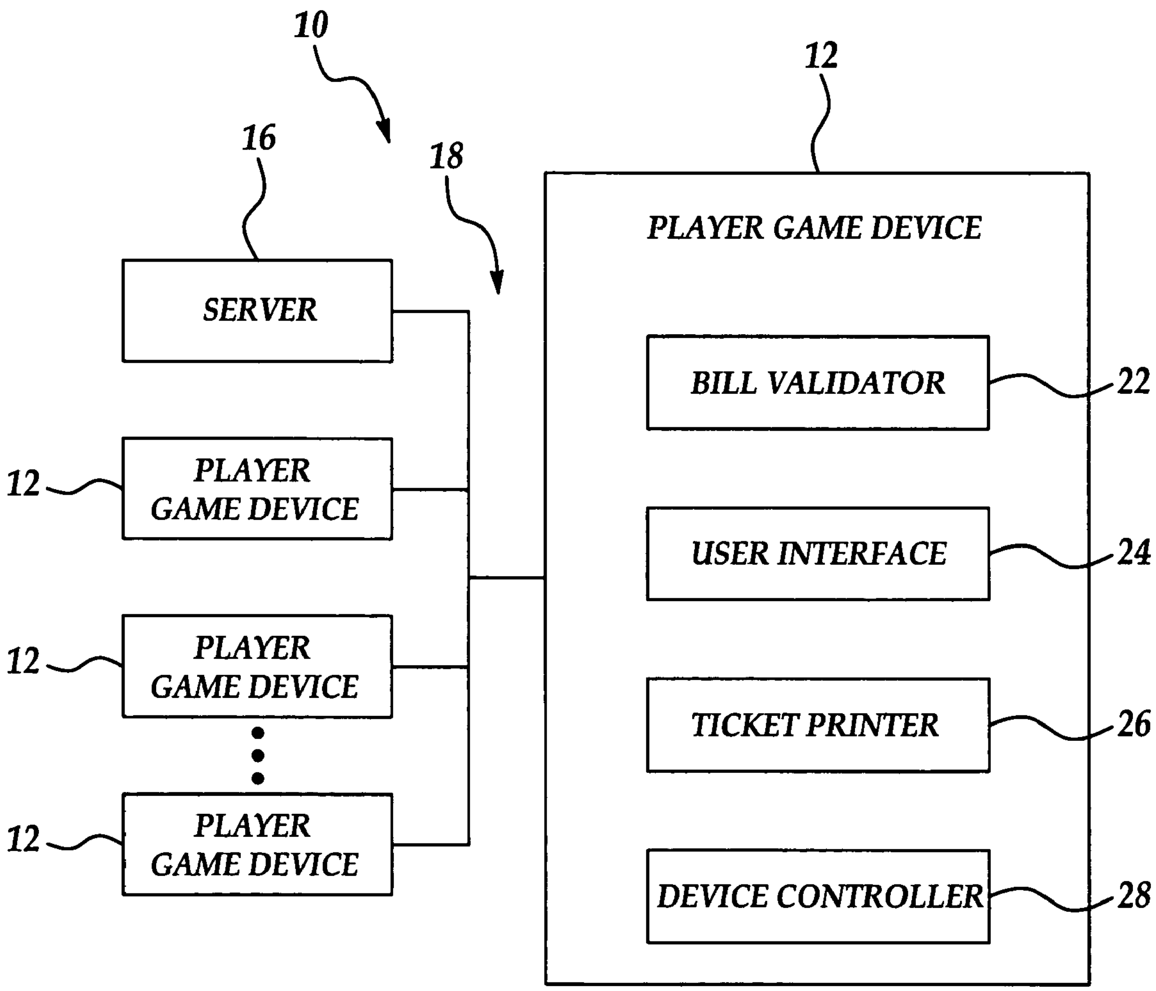
FIG. 2 is a block diagram of a game system for simulating the outcome of an electronic bingo game as a blackjack game, according to another embodiment of the present invention.

With particular reference to FIG. 2 in one embodiment, a plurality of player game devices 12 connected to a server 16 are provided. The game controller 14 is implemented by the server 16. Each player device 12 may be connected to the server 16 by an Ethernet link 18.

The player game device 12 allows a player to place a wager and purchase an electronic bingo card 20. In one embodiment, the electronic bingo card is a 5×5 grid with the columns labeled B, I, N, G, and O, respectively. The center cell maybe a "free" cell.

Each Bingo game has at least one winning pattern. A winning pattern is a sub-set of the cells of the grid which trigger an award or payout. The amount of the award or payout may dependent upon the wager made by the player and a predetermined pay table. In one embodiment, each Bingo game has a game-ending pattern which signifies the end of the game. For example, the game-ending pattern may include all of the cells of the electronic bingo card 20. The payout associated with the game-ending pattern is paid to the first player who achieves the game-ending pattern.

One or more interim winning patterns may also be included. The interim winning patterns may provide a payout, without ending the game, as a function of the player's wager and a second pay table. The interim winning patterns may have other conditions associated therewith. For example, in order for a payout to occur, the interim winning pattern must be achieved within a predetermined number of the randomly drawn numbers.

The game controller 14 is coupled to the player game device 12 and establishes a set of chosen numbers. In one embodiment, the set of chosen numbers are randomly chosen using a random number generator (not shown).

In one embodiment, there are a predetermined number of numbers in the set of chosen numbers, e.g., seventy-five.

In one embodiment, the predetermined number of numbers in the set of chosen numbers are established within a predetermined period of time, e.g., approximately 10 seconds.

The game controller 14 compares the set of randomly chosen numbers with the associated winning pattern and establishing an outcome of the electronic bingo game. The outcome of the electronic bingo game may include a payout according to a first pay table if the winning pattern has been achieved. The winning pattern may be the game ending pattern and/or one or more interim winning patterns. In other words, the outcome of the electronic bingo game may include a payout to the player if the game ending pattern is achieved and, alternatively or in addition, may include a second payout if an interim winning pattern is achieved.

The outcome of the electronic bingo game maybe a "loss" if no winning pattern is achieved after all numbers have been selected or another player achieves the game winning pattern.

After the Bingo game has been played, the game controller 14 simulates a blackjack game on the player game device 12. The outcome of the blackjack game is the equivalent to the outcome of the electronic bingo game. In the simulated blackjack game, the player and a "dealer" are dealt electronic playing cards. Whomever's cards total closer to 21 without going over is the winner. Standard blackjack rules may be applied. For example, the dealer or player may request a "hit", i.e., another card or may "stick" with the cards currently held. No matter how the player plays the simulated blackjack game, the outcome of the blackjack game does not change, it is always the same as the outcome of the electronic bingo game.

With specific reference to FIG. 2, the player game device 12 may be a stand-alone device, console or upright machine which is connected to the server 16 via, for example, an Ethernet link. In one embodiment, the player game device 12 includes a bill validator 22, a user interface 24, a ticket printer 26, and a device controller 28.

To initiate the play of the game, a player inserts credits or coins, or currency into the player game device 12. Coins may be inserted into a coin acceptor (not shown) if provided. Currency may be inserted into a bill validator 22. The coins or currency may be converted into credits. Alternatively or in addition, the player may insert a ticket or card having a number of credits represented thereon or may insert a player tracking card to access credits in a player account.

The user interface device 24 allows interaction between the player game device 12, the game controller 14, and the player. The user interface device 24 includes a display screen and a plurality of buttons (see FIGS. 3 and 4). In one embodiment, the user interface device 24 is a touch-screen device 30 (see FIGS. 3 and 4). User input buttons are implemented by the touch screen 30. Alternatively, or in addition, other input buttons may be implemented by mechanical push-buttons. The number of credits or currency input by the player are added to a credit meter 32 and displayed on the display screen 30 at 32.

The user interface device 24 also provides a menu button 33. The player may access additional functions via the menu button 33. For example, the menu button 33 provides the player with an opportunity, through a menu item, to cash out. In one embodiment, in response to the player choosing to cash out, a ticket representing the remaining credits on the credit meter 32 is printed by the ticket printer 26. The printed ticket may be redeemed for cash at a kiosk or cashier station.

The bill validator 22, the user interface device 24, and the ticket printer 26 are coupled to and controlled by the device controller 28. The device controller 28 also manages communications to and between the server 16.

Figure 3:
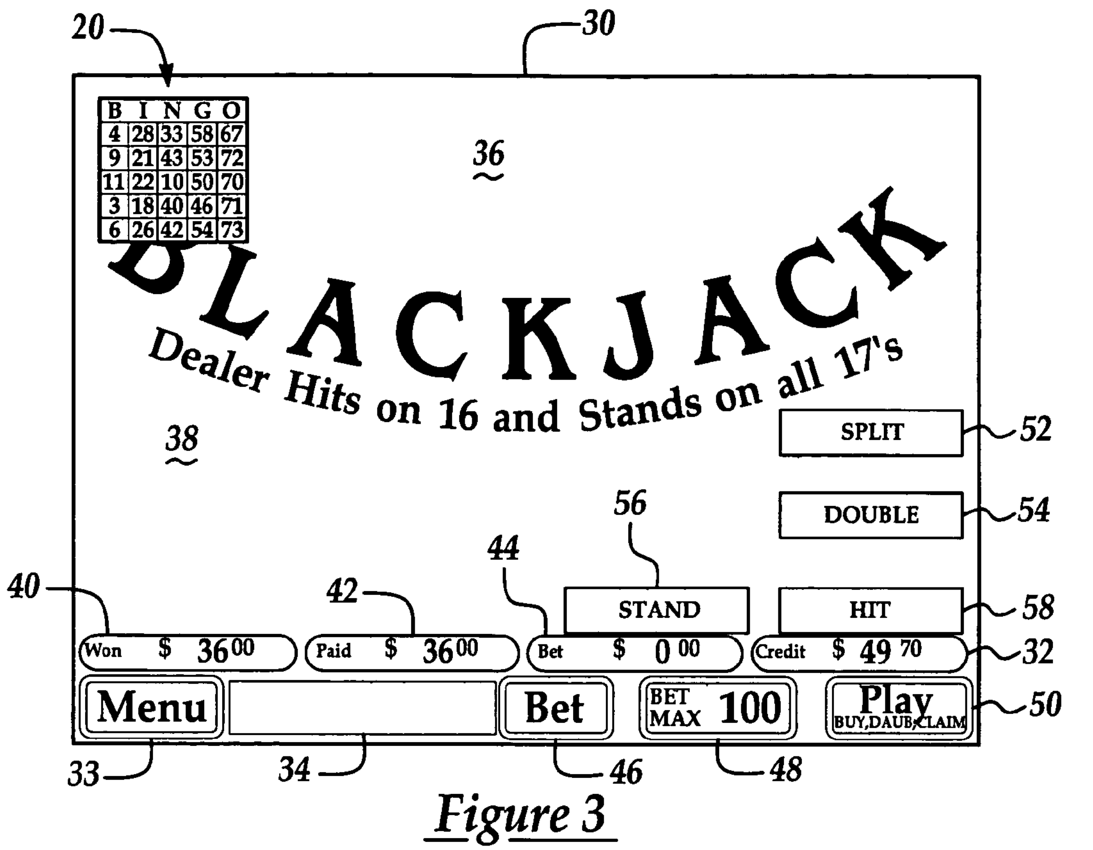
FIG. 3 is a first illustrative screenshot for use in a game system for simulating the outcome of an electronic bingo game as a blackjack game, according to another embodiment of the present invention; and, FIG. 4 is a second illustrative screenshot for use in a game system for simulating the outcome of an electronic bingo game as a blackjack game.
Figure 4:
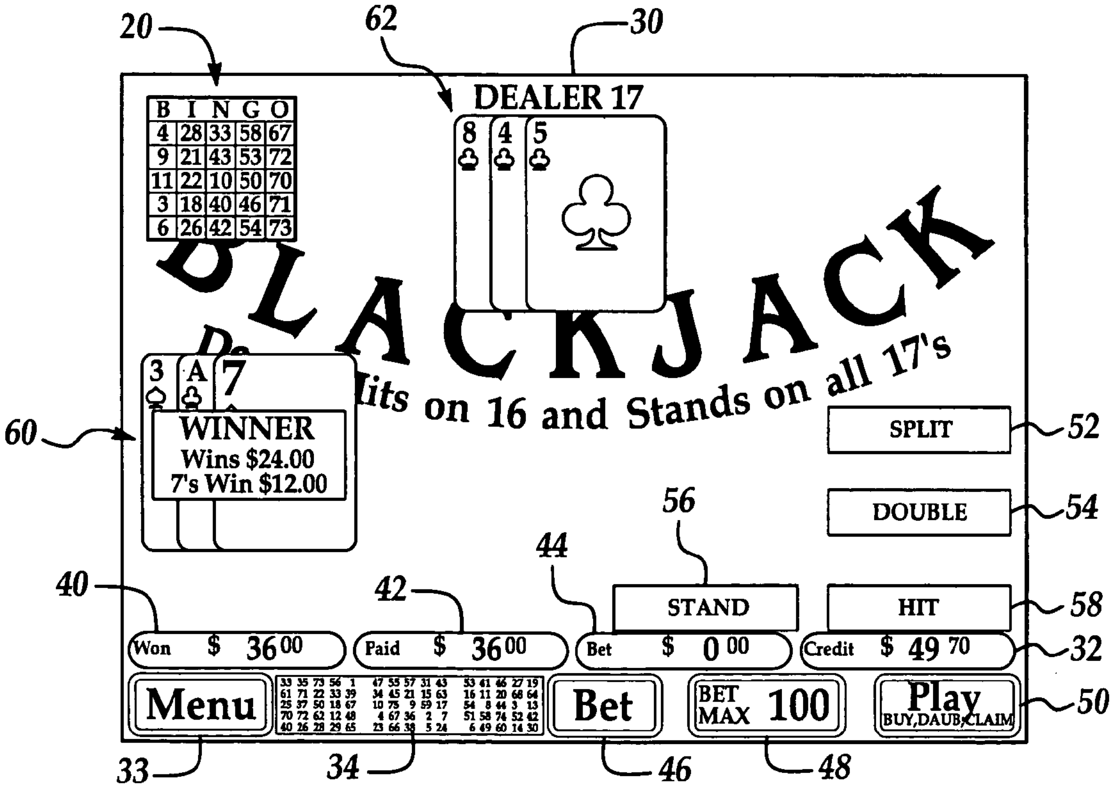

As shown in FIGS. 3 and 4, the electronic bingo card 20 is represented on the touchscreen display 30. Prior to the commencement of the games, the cells on the game card are shown in a neutral color, e.g., white. As the set of chosen numbers are chosen, the numbers are displayed in a number display area 34. If the chosen number appears on the player's bingo card, then that number is highlighted, shown in another color, such as red or pink. The electronic Bingo card 20 may also highlight any winning pattern, e.g., by showing the numbers in the cells of the interim winning pattern in another color.

In another aspect of the present invention, the player game device 12 allows the player to purchase additional electronic bingo cards 20, prior to any player achieving the game ending pattern or the last number in the set of chosen numbers having been chosen.

The touchscreen display 30 further includes a dealer card display area 36, a player card display area 38, a won meter 40, a paid meter 42, and a bet meter 44. The dealer and player card display areas 36, 38 are used to show the cards of the dealer and player, during the simulated blackjack game (see below). The won meter 40 shows the number of credits or amount won by the player in the current session. The paid meter 42 shows the amount paid to the player in the current session. The bet meter 44 shows the current bet made by the player.

The touch-screen display 30 further includes a bet button 46, a bet max button 48, and a play button 50. As discussed below, the touch-screen display 30 further includes a split button 52, a double button 54, a stand button 56, and a hit button 58 which are utilized during the simulated blackjack game.

In one embodiment of the present invention, the game controller 12, during the simulated blackjack game, deals the player an appropriate set of electronic playing cards 60 to achieve the payout conforming to the outcome of the electronic bingo game.

In another embodiment of the present invention, the game controller 12, during the simulated blackjack game, deals a dealer an appropriate set of electronic playing cards 62 to achieve the outcome of the electronic bingo game.

In one embodiment of the present invention, the outcome of the bingo game is one of a win to the player, a loss to the player, or a push the player (player retains his wager). The following is a list of rules which control the cards dealt to the player and/or dealer to conform the outcome of the simulated blackjack game to the outcome of the Bingo game. It should be noted that variations are possible and that the present invention is not limited to any such set of rules.

If the outcome of the electronic bingo game is a loss to the player, then the game controller 12 deals cards to the player that can never add up to 21, the game controller 12 then deals cards to the dealer that beat the player's cards.

If the outcome of the electronic bingo game is a win to the player, then the game controller 12 deals cards that will add to 17 or higher without busting, the game controller 12 then deals cards to the dealer that either lose or bust.

If the outcome of the electronic game is a push, then the game controller 12 deals two cards to the player that add up to 17, any subsequent cards dealt to the player must result in a total of 21, the game controller 12 then deals cards to the dealer that equal the total of the player's cards.

In the case of a win, the actual payout is determined as a function of the player's wager and the associated pay table for each winning pattern. Based on the winning patterns, i.e., the game winning pattern and/or any winning pattern, an additional factor may be used to determine the actual payout. The factor is dependent upon the winning patterns matched on the player's electronic Bingo card. For example, the winning patterns may result in an additional factor of 1.5. This outcome may be implemented by, for example, automatically dealing the player a blackjack. In this scenario, the cards dealt to the dealer must not equal 21. During the simulated Blackjack game, the player uses the split button 52, the double button 54, the stand button 56, and the hit button 58, to control the dealing of the cards, however, the outcome of the simulated Blackjack game is not modified.

In another aspect of the present invention, a method for playing an electronic bingo game is provided. The method includes the steps of allowing a player to place a wager and purchase an electronic bingo card, establishing a set of randomly chosen numbers, comparing the set of randomly chosen numbers with the associated winning pattern and establishing an outcome of the electronic bingo game. The electronic bingo card has a grid containing a set of numbers and an associated winning pattern. The outcome of the electronic bingo game includes a payout according to a first pay table if the winning pattern has been achieved. An electronic blackjack game is simulated. The outcome of the blackjack game is equivalent to the outcome of the electronic bingo game.

INDUSTRIAL APPLICABILITY

Referring to the Figures in the illustrated embodiment, the cards 62 dealt to the dealer as pre-determined by the game controller 14 are positioned in the upper center of the display 30, i.e., the dealer card display area 36. The cards 60 dealt to the player as pre-determined by the game controller are positioned in the center left of the display 30, i.e., the player card display area 38. The split button 52, the double button 54, the stand button 56, and the hit button 58 to select a split, a double, a stand, and a hit, are positioned in the lower right of the display 30. The total numeric value of the accumulated dealer cards 62 is positioned in the upper center of the display 30. The total numeric value of the accumulated player cards 60 is positioned in the lower left of the display 30.

There is no possibility for error or player strategy in the simulated blackjack game to alter the results of the game, since the game controller 14 selects and displays the cards. s-Specifically, in order to present the bingo results as a round of blackjack, the dealing of cards is controlled. Six specific scenarios are described to illustrate the controlled deals.

If the bingo game is lost, the player is dealt cards that can never add up to exactly 21. If the player draws cards whose additive cumulative value exceeds 21, the dealer's cards are dealt such that the total will reach any value of 21 or less. If the player stands with a card value less than 21, the dealer's cards are dealt such that the dealer's total will exceed the value of the player's total.

If the bingo game is won mandating that the player be presented with a "win" in the ensuing blackjack presentation, the player is dealt cards that whose values will add up to 17 or higher such that the total value of the cards will never exceed 21. If the player decides to draw a card when it is statistically unfavorable, the cards are arranged such that the total value of the player's cards will reach exactly 21. After the total value of the player's cards reaches 21, the dealer's cards are dealt such that the total value of the cards will be less than or greater than 21, but never exactly equal. If a blackjack is dealt to the player, an amount of one and one half times the original wager is paid to the player. Within this scenario, the dealer is dealt cards such that the total value of the cards cannot equal 21.

If the bingo game results in a tie with an equal stakes wager, the cards are dealt to the player such that the total additive value of the player's first two cards is equal to 17. After the first two cards are dealt, the cards are dealt in the same manner as with a bingo win.

In the case that a player's first two dealt cards have the same numerical value, the player is allowed to divide the hand into two separate and discrete hands to be played. The player is obliged to increase the amount wagered by placing a sum equal to the original wager on the new hand thus created. This occurrence, termed a split, is considered free in the subject invention in order to avoid changing the wager after the bingo game has already been played. Occasionally, a win/lose or a lose/lose on both hands is dealt to present a simple win and loss respectively. Only a split won on both hands is required to present a bingo win that awards the player with an amount that is four times the amount of the original wager. If the player chooses not to split the hand, the four times wager is simply paid. Ties are currently not dealt if the player chooses to split the hand.

If, after the first two cards are dealt to the player and the total value of the cards is less than 21, the player has the option to double the original wager in exchange for one additional card. This occurrence, termed a double, is considered free in the subject invention in order to avoid changing the wager after the bingo game has already been played. If the bingo game has paid the player an amount that is four times the amount of the original wager, doubles may be dealt rather than splits resulting in the player winning each of the two discrete hands. Doubles may also be occasionally dealt and made to result in a tie to present a payoff to the player of two times the original wager. Doubles are forced to win, lose, or tie as described above except according to the rules of a double wager which state that one and only one more card can be dealt to the player.

Obviously, many modifications and variations of the present invention are possible in light of the above teachings. The invention may be practiced otherwise than as specifically described within the scope of the appended claims.

What is claimed is:

1. A game system for playing an electronic game, comprising:

a player game device for allowing a player to place a wager, the player game device including a user interface; and, a game controller coupled to the player game device for playing the electronic game and establishing an outcome of the electronic game, the electronic game being a bingo game, the outcome of the electronic game including a payout according to a first pay table if a set of predetermined winning conditions has been achieved, the game controller further for simulating a blackjack game on the player device by allowing the player to make decisions during the simulation using the user interface, the outcome of the blackjack game being responsive to the decisions made by the player and equivalent to the outcome of the electronic game, wherein if the outcome of the electronic game is a loss to the player, then the game controller deals cards to the player that can never add up to 21, the game controller then deals cards to the dealer that beat the player's cards.

2. A game system, as set forth in claim 1, wherein the game system include a plurality of player game devices, the game controller being implemented in a server, each player game device being connected to the server.

3. A game system, as set forth in claim 2, the plurality of player game devices allowing a plurality of players to compete with and against each other in the electronic game.

4. A game system, as set forth in claim 1, the player game device including a bill validator for accepting currency and responsively providing a number of credits which may be played by the player.

5. A game system, as set forth in claim 1, the user interface device includes a touch-screen display.

6. A game system, as set forth in claim 1, the player game device including a ticket printer for printing a redeemable ticket for any remaining credits on the player game device.

7. A game system, as set forth in claim 1, the player game device including a bill validator, a user interface device, a ticket printer all coupled to and controller by a device controller.

8. A game system, as set forth in claim 1, wherein the game controller, during the simulated blackjack game, deals the player an appropriate set of electronic playing cards to achieve the payout conforming to the outcome of the electronic game.

9. A game system, as set forth in claim 1, wherein the game controller, during the simulated blackjack game, deals a dealer an appropriate set of electronic playing cards to achieve the payout conforming to the outcome of the electronic game.

10. A game system, as set forth in claim 1, wherein if the outcome of the electronic game is a win to the player, then the game controller deals cards that will add to 17 or higher without busting, the game controller then deals cards to the dealer that either lose or bust.

11. A game system, as set forth in claim 10, wherein if the outcome of the electronic game is a push, then the game controller deals two cards to the player that add up to 17, any subsequent cards dealt to the player must result in a total of 21, the game controller then deals cards to the dealer that equal the total of the player's cards.

12. A game system, as set forth in claim 11, wherein if the outcome of the electronic game is a payout of 1.5 times the player's wager, then the game controller deals a blackjack to the player, the cards dealt to the dealer must not equal 21.

13. A game system, as set forth in claim 1, wherein the electronic game is an electronic bingo game, the player game device for allowing the player to purchase an electronic bingo card, the electronic bingo card have a grid containing a set of numbers and an associated winning pattern, the game controller for establishing a set of randomly chosen numbers, comparing the set of randomly chosen numbers with the associated winning pattern and establishing an outcome of the electronic bingo game, the outcome of the electronic bingo game including a payout according to a first pay table if the winning pattern has been achieved.

14. A method for playing an electronic game, including the steps of:

providing a display and user interface;

allowing a player to place a wager;

playing the electronic game and establishing an outcome of the electronic game, the electronic game being a bingo game, the outcome of the electronic game including a payout according to a first pay table if a set of predetermined winning conditions has been achieved; and, simulating an electronic blackjack game by allowing the player to make decisions during the simulation using the user interface, the outcome of the blackjack game being responsive to the decisions made by the player and equivalent to the outcome of the electronic game, wherein if the outcome of the electronic game is a loss to the player, then the step of simulating a blackjack game includes the steps of dealing cards to the player that can never add up to 21 and dealing cards to the dealer that beat the player's cards.

15. A method, as set forth in claim 14, including the step of allowing a plurality of players to compete with and against each other in the electronic game.

16. A method, as set forth in claim 14, wherein the step of simulating a blackjack game includes the step of dealing the player an appropriate set of electronic playing cards to achieve the payout conforming to the outcome of the electronic game.

17. A method, as set forth in claim 14, wherein the step of simulating a blackjack game includes the step of dealing a dealer an appropriate set of electronic playing cards to achieve the payout conforming to the outcome of the electronic game.

18. A method, as set forth in claim 14, wherein if the outcome of the electronic game is a win to the player, then the step of simulating a blackjack game includes the steps of dealing cards to the player that will add to 17 or higher without busting and game dealing cards to the dealer that either lose or bust.

19. A method, as set forth in claim 18, wherein if the outcome of the electronic game is a push, then the step of simulating a blackjack game includes the steps of dealing two cards to the player that add up to 17, any subsequent cards dealt to the player must result in a total of 21 and dealing cards to the dealer that equal the total of the player's cards.

20. A method, as set forth in claim 19, if the outcome of the electronic game is a payout of 1.5 times the player's wager, then the step of simulating a blackjack game includes the step of dealing a blackjack to the player, the cards dealt to the dealer must not equal 21.

21. A method, as set forth in claim 14, wherein the electronic game is an electronic bingo game, including the step of allowing the player to purchase an electronic bingo card, the electronic bingo card have a grid containing a set of numbers and an associated winning pattern, the method further including the steps of establishing a set of randomly chosen numbers, comparing the set of randomly chosen numbers with the associated winning pattern and establishing an outcome of the electronic bingo game, the outcome of the electronic bingo game including a payout according to a first pay table if the winning pattern has been achieved.

22. A game system for playing an electronic bingo game, said game comprising:

a player game device for allowing a player to place a wager and purchase an electronic bingo card, the electronic bingo card have a grid containing a set of numbers and an associated winning pattern the player game device including a display and a user interface; and, a game controller coupled to the player game device for establishing a set of randomly chosen numbers, comparing the set of randomly chosen numbers with the associated winning pattern and establishing an outcome of the electronic bingo game, the outcome of the electronic bingo game including a payout according to a first pay table if the winning pattern has been achieved, the game controller further for simulating a blackjack game on the player device by allowing the player to make decisions during the simulation using the user interface, the outcome of the blackjack game being responsive to the decisions made by the player and equivalent to the outcome of the electronic bingo game, the game controller in simulating the blackjack game deals initial cards to the player and/or to a dealer of the simulated blackjack game, provides to the player, via the user interface, an opportunity to receive another card or to stand, deals another card to the player if the player requests another card, wherein if the outcome of the electronic game is a loss to the player, the initial cards or the initial cards and the another card are chosen by the game controller such that they represent a loss to the player, and wherein, if the outcome of the electronic game is a win to the player, the initial cards or the initial cards and the another card are chosen by the game controller such that they represent a win to the player, the player game device for displaying the initial cards and any other card(s) on the display.

23. A game system, as set forth in claim 22, wherein the set of randomly chosen numbers includes a predetermined number of numbers.

24. A game system, as set forth in claim 22, including at least one interim pattern, the at least one interim pattern resulting in a payout according to a second pay table.

25. A game system, as set forth in claim 22, the player game device including a bill validator for accepting currency and responsively providing a number of credits which may be played by the player.

26. A game system, as set forth in claim 22, the player game device having a user interface device for allowing interaction between the player game device and game controller and the player.

27. A game system, as set forth in claim 26, the user interface device includes a touch-screen display.

28. A game system, as set forth in claim 22, the player game device including a ticket printer for printing a redeemable ticket for any remaining credits on the player game device.

29. A game system, as set forth in claim 22, the player game device allows the player to purchase more than one electronic bingo card.

30. A game system, as set forth in claim 22, wherein the game controller establishes the set of randomly determined numbers over a predetermined time period.

31. A game system, as set forth in claim 30, the player game device allowing the player to purchaser additional electronic bingo cards during the predetermined time period by placing an additional wager.

32. A method for playing an electronic bingo game, including the steps of:

providing a display and a user interface;

allowing a player to place a wager and purchase an electronic bingo card, the electronic bingo card have a grid containing a set of numbers and an associated winning pattern;

establishing a set of randomly chosen numbers;

comparing the set of randomly chosen numbers with the associated winning pattern and establishing an outcome of the electronic bingo game, the outcome of the electronic bingo game including a payout according to a first pay table if the winning pattern has been achieved; and, simulating an electronic blackjack game by allowing the player to make decisions during the simulation using the user interface, the outcome of the blackjack game being responsive to the decisions made by the player and equivalent to the outcome of the electronic bingo game, the step of simulating an electronic blackjack game including the steps of dealing initial cards to the player and dealer and displaying the initial cards on the display, providing to the player, via the user interface, an opportunity to receive another card or to stand and dealing another card to the player if the player requests another card and displaying the other card(s) on the display, wherein if the outcome of the electronic bingo game is a loss to the player, then the initial cards or the initial and the other cards are chosen by the game controller such that they represent a loss to the player, if the outcome of the electronic bingo game is a win to the player, then the initial cards or the initial and the other cards represent a win to the player.

33. A method, as set forth in claim 32, wherein the associated winning pattern is a game ending pattern, the payout under the first pay table being awarded only to the first player whose electronic bingo card has the game ending pattern.

34. A method, as set forth in claim 32, wherein the set of randomly chosen numbers includes a predetermined number of numbers.

35. A method, as set forth in claim 32, including at least one interim pattern, the at least one interim pattern resulting in a payout according to a second pay table.

36. A method, as set forth in claim 32, including the step of allowing the player to purchase more than one electronic bingo card by placing additional wagers.

37. A method, as set forth in claim 32, wherein the set of randomly determined numbers are established over a predetermined time period.

38. A method, as set forth in claim 37, including the step of allowing the player to purchase additional electronic bingo cards by placing additional wagers during the predetermined time period.

* * * * *

UNITED STATES PATENT AND TRADEMARK OFFICE

CERTIFICATE OF CORRECTION

PATENT NO. : 7,896,736 B2
APPLICATION NO. : 10/938490
DATED : March 1, 2011
INVENTOR(S) : Jon Yarbrough It is certified that error appears in the above-identified patent and that said Letters Patent is hereby corrected as shown below:

Column 7, Line 54: Delete “controller” and replace with --controlled--

Column 8, Lines 14 and 15: Delete “, wherein the electronic game is an electronic bingo game”

Column 9, Lines 9 and 10: Delete “, wherein the electronic game is an electronic bingo game”

Column 9, Line 23: Delete “have” and replace with --having--

Column 10, Line 8: Delete “determined” and replace with --chosen--

Column 10, Line 18: Delete “have” and replace with --having--

Signed and Sealed this
Tenth Day of May, 2011

David J. Kappos
*Director of the United States Patent and Trademark Office*